(12) United States Patent
Murray et al.

(10) Patent No.: US 12,521,141 B2
(45) Date of Patent: Jan. 13, 2026

(54) TISSUE-REMOVING CATHETER INCLUDING DRIVE ASSEMBLY

(71) Applicant: MEDTRONIC VASCULAR INC., Santa Rosa, CA (US)

(72) Inventors: Aran Murray, Galway (IE); Eoin J. Walsh, Galway (IE); Thomas P. Hayden, Turloughmore (IE); Martin B. Patten, Westport (IE)

(73) Assignee: MEDTRONIC VASCULAR, INC., Santa Rosa, CA (US)

( * ) Notice: Subject to any disclaimer, the term of this patent is extended or adjusted under 35 U.S.C. 154(b) by 804 days.

(21) Appl. No.: 17/812,580

(22) Filed: Jul. 14, 2022

(65) Prior Publication Data

US 2023/0064262 A1    Mar. 2, 2023

Related U.S. Application Data

(60) Provisional application No. 63/260,726, filed on Aug. 30, 2021.

(51) Int. Cl.
*A61B 17/3207* (2006.01)
*A61B 17/32* (2006.01)

(52) U.S. Cl.
CPC ......... *A61B 17/320758* (2013.01); *A61B 17/320783* (2013.01); *A61B 2017/320004* (2013.01)

(58) Field of Classification Search
CPC ........ A61B 17/320758; A61B 17/3207; A61B 17/320725; A61B 2017/00017; A61M 25/0082
See application file for complete search history.

(56) References Cited

U.S. PATENT DOCUMENTS

| | | | | |
|---|---|---|---|---|
| 5,836,868 A | * | 11/1998 | Ressemann | A61B 17/320725 606/159 |
| 6,477,427 B1 | * | 11/2002 | Stolz | A61N 1/05 607/116 |
| 8,992,717 B2 | * | 3/2015 | Zeroni | B29C 66/532 156/294 |
| 11,690,645 B2 | * | 7/2023 | Fleming | A61B 17/32002 606/159 |
| 11,819,236 B2 | * | 11/2023 | Kelly | A61B 17/320758 |
| 2002/0007190 A1 | * | 1/2002 | Wulfman | A61B 17/320725 606/171 |
| 2007/0088230 A1 | * | 4/2007 | Terashi | A61M 25/09 600/585 |
| 2013/0090632 A1 | * | 4/2013 | Tahara | A61M 25/0012 604/526 |

(Continued)

OTHER PUBLICATIONS

Extended European Search Report for corresponding Application No. 22192406.1, Jan. 10, 2023, 8 pages, München, Germany.

*Primary Examiner* — Scott J Medway
(74) *Attorney, Agent, or Firm* — Stinson LLP

(57) ABSTRACT

A tissue-removing catheter includes a drive assembly. The drive assembly includes a gear rotatable about an axis, a gear extension coupled to the gear and extending axially outward from the gear, and a lock received in and coupled to the gear extension. The gear extension is rotatably driven by the gear, and the lock is rotatably driven by the gear extension. An elongate drive member is received in and coupled to the lock. The drive member is driven by the lock, whereby rotation of the gear imparts rotation to the drive coil.

17 Claims, 13 Drawing Sheets

(56) References Cited

U.S. PATENT DOCUMENTS

| | | | |
|---|---|---|---|
| 2013/0237930 A1* | 9/2013 | Mulvihill | A61J 15/0026 604/264 |
| 2014/0276015 A1* | 9/2014 | Whiseant | A61B 17/3207 600/407 |
| 2015/0164540 A1 | 6/2015 | Higgens et al. | |
| 2015/0209072 A1* | 7/2015 | Higgins | F16D 3/12 464/30 |
| 2017/0202607 A1* | 7/2017 | Shelton, IV | A61N 7/02 |
| 2018/0317955 A1* | 11/2018 | Jamous | A61B 17/32002 |
| 2020/0129736 A1* | 4/2020 | Morimoto | A61M 25/0012 |
| 2020/0155194 A1 | 5/2020 | Schneider et al. | |
| 2020/0215335 A1* | 7/2020 | McLaughlin | A61N 1/05 |
| 2020/0360047 A1 | 11/2020 | Kelly et al. | |

* cited by examiner

TISSUE-REMOVING CATHETER INCLUDING DRIVE ASSEMBLY

CROSS-REFERENCE TO RELATED APPLICATION

The present application claims the benefit of U.S. Provisional Application No. 63/260,726, filed Aug. 30, 2021, the entirety of which is hereby incorporated by reference.

FIELD

The present disclosure generally relates to a tissue-removing catheter, and more particular, to a drive assembly configured to operatively couple a drive coil to a motor of the tissue-removing catheter.

BACKGROUND

Tissue-removing catheters are used to remove unwanted tissue in body lumens. As an example, atherectomy catheters are used to remove material from a blood vessel to open the blood vessel and improve blood flow through the vessel. This process can be used to prepare lesions within a patient's coronary artery to facilitate percutaneous coronary angioplasty (PTCA) or stent delivery in patients with severely calcified coronary artery lesions. Atherectomy catheters typically employ a rotating element which is used to abrade or otherwise break up the unwanted tissue.

SUMMARY

In one aspect, a tissue-removing catheter for removing tissue in a body lumen generally comprises a drive assembly including a gear rotatable about an axis, a gear extension coupled to the gear and extending axially outward from the gear, and a lock received in and coupled to the gear extension. The gear extension is configured to be rotatably driven by the gear, and the lock is configured to be rotatably driven by the gear extension. A drive coil is received in and coupled to the lock. The drive coil is configured to be rotatably driven by the lock, whereby rotation of the gear imparts rotation to the drive coil.

In another aspect, a tissue-removing catheter for removing tissue in a body lumen generally comprises a drive assembly including a gear rotatable about an axis. A gear extension is coupled to the gear and extends axially outward from the gear. A lock received in and coupled to the gear extension. The gear extension is configured to be rotatably driven by the gear. The lock is configured to be rotatably driven by the gear extension. An elongate drive member is received in and coupled to the lock. The drive member is configured to be rotatably driven by the lock. Rotation of the gear imparts rotation to the drive member.

BRIEF DESCRIPTION OF THE DRAWINGS

Corresponding reference characters indicate corresponding parts throughout the drawings.

DETAILED DESCRIPTION

Figure 1:
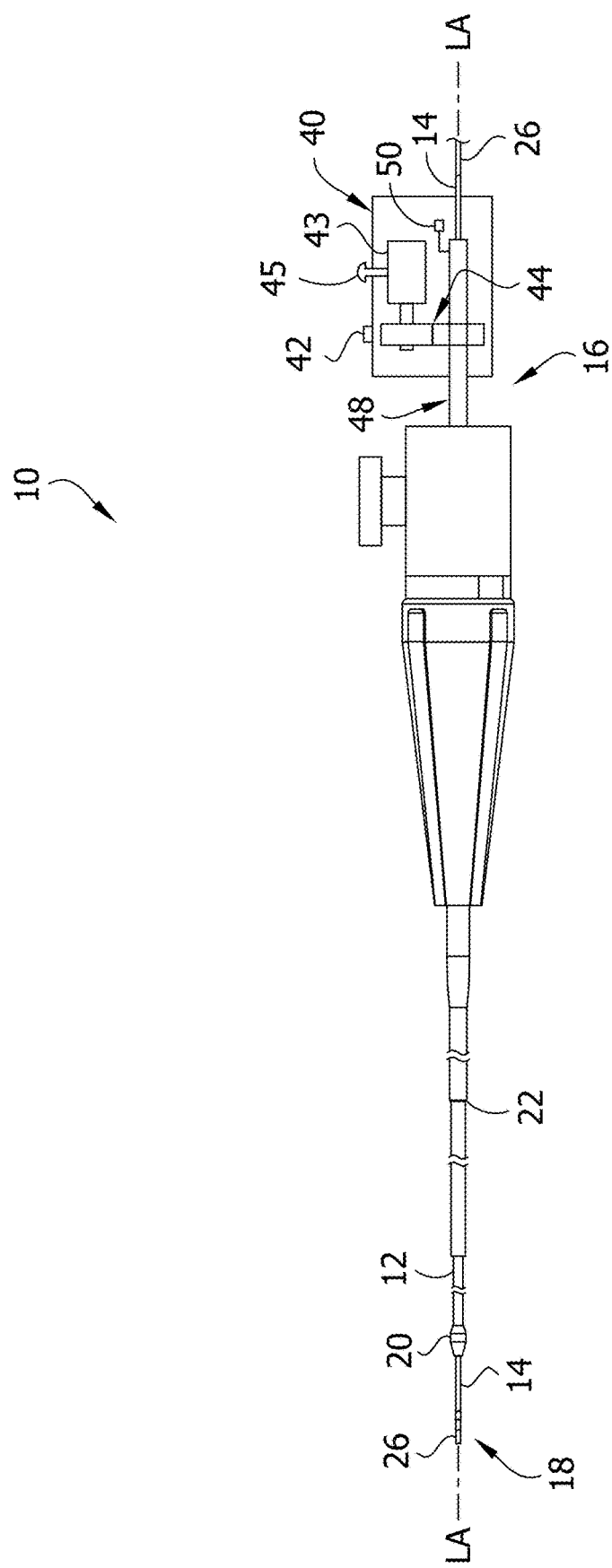
FIG. 1 is a schematic illustration of a catheter of the present disclosure.

Referring to the drawings, and in particular FIG. 1, a rotational tissue-removing catheter for removing tissue in a body lumen is generally indicated at reference number 10. The illustrated catheter 10 is a rotational atherectomy device suitable for removing (e.g., abrading, cutting, excising, ablating, etc.) occlusive tissue (e.g., embolic tissue, plaque tissue, atheroma, thrombolytic tissue, stenotic tissue, hyperplastic tissue, neoplastic tissue, etc.) from a vessel wall (e.g., coronary arterial wall, etc.). The catheter 10 may be used to facilitate percutaneous coronary angioplasty (PTCA) or the subsequent delivery of a stent. Features of the disclosed embodiments may also be suitable for treating chronic total occlusion (CTO) of blood vessels, and stenoses of other body lumens and other hyperplastic and neoplastic conditions in other body lumens, such as the ureter, the biliary duct, respiratory passages, the pancreatic duct, the lymphatic duct, and the like. Neoplastic cell growth will often occur as a result of a tumor surrounding and intruding into a body lumen. Removal of such material can thus be beneficial to maintain patency of the body lumen.

The catheter 10 is sized for being received in a blood vessel of a subject. Thus, the catheter 10 may have a maximum size of 3, 4, 5, 6, 7, 8, 9, 10, or 12 French (1, 1.3, 1.7, 2, 2.3, 2.7, 3, 3.3, or 4 mm) and may have a working length of 20, 30, 40, 60, 80, 100, 120, 150, 180 or 210 cm depending of the body lumen. While the remaining discussion is directed toward a catheter for removing tissue in blood vessels, it will be appreciated that the teachings of the present disclosure also apply to other types of tissue-removing catheters, including, but not limited to, catheters for penetrating and/or removing tissue from a variety of occlusive, stenotic, or hyperplastic material in a variety of body lumens.

Figure 2:
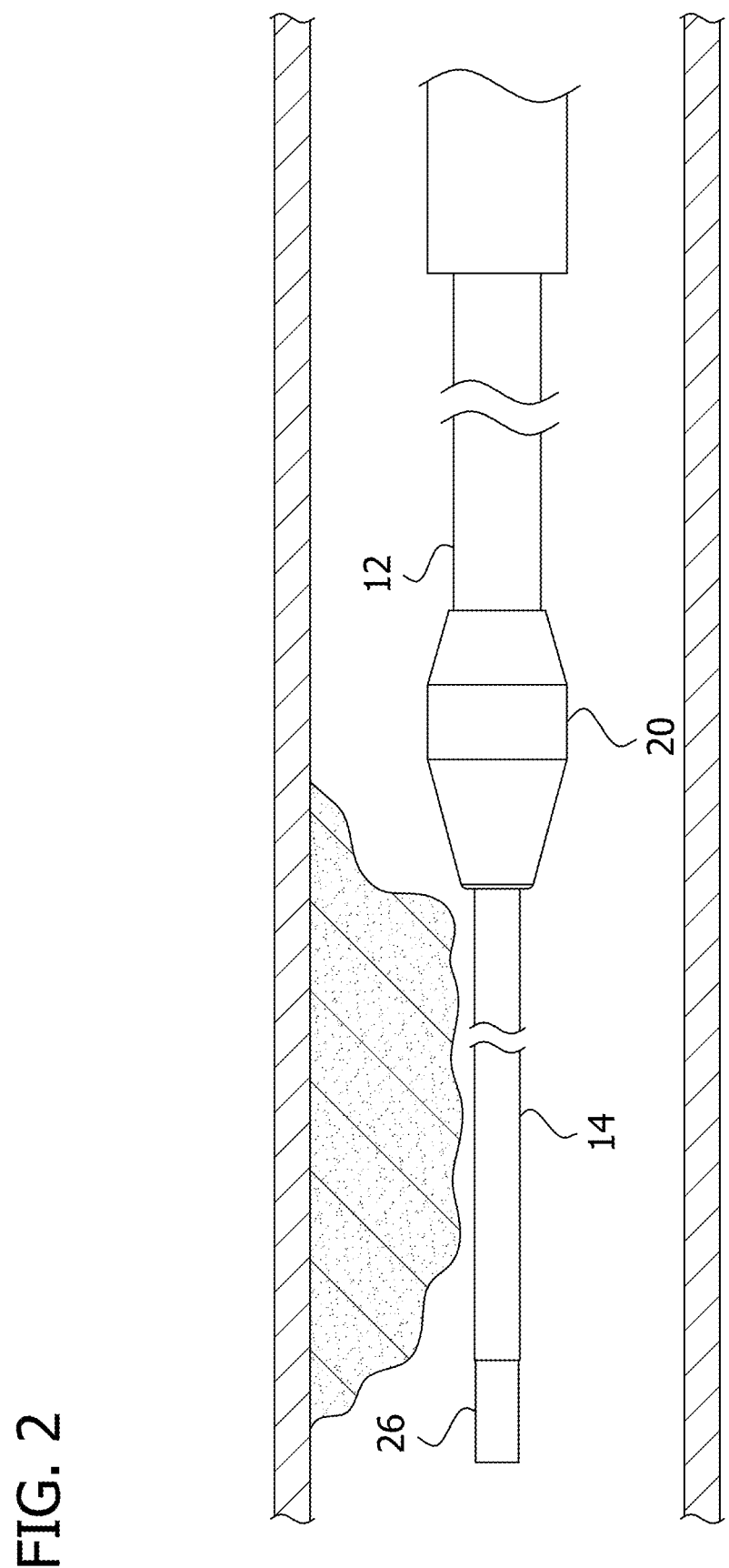
FIG. 2 is an enlarged elevation of a distal end portion of the catheter.

Referring to FIGS. 1 and 2, the catheter 10 comprises an elongate drive member 12 and an elongate inner liner 14 received in and extending along the drive member. In the illustrated embodiment, the elongate drive member 12 comprises a drive coil indicated by the same reference numeral 12. The drive coil 12 and inner liner 14 extend along a longitudinal axis LA of the catheter from a proximal end portion 16 to a distal end portion 18 of the catheter. A tissue-removing element 20 (e.g., an abrasive burr) is disposed on a distal end of the drive coil 12 and is configured for rotation to remove tissue from a body lumen as will be explained in greater detail below. An isolation sheath 22 (FIG. 1) is disposed around the drive coil 12. The drive coil 12 and the inner liner 14 are both configured to translate relative to the isolation sheath 22. The catheter 10 is sized and shaped for insertion into a body lumen of a subject. The isolation sheath 22 isolates the body lumen from at least a portion of the drive coil 12 and inner liner 14. The inner liner 14 defines a guidewire lumen 24 (FIG. 8) for slidably receiving a guidewire 26 therein so that the catheter 10 can be advanced through the body lumen by traveling along the guidewire. The guidewire can be a standard 0.014-inch outer diameter, 300 cm length guidewire. In certain embodiments, the inner liner 14 may have a lubricious inner surface for sliding over the guidewire 26 (e.g., a lubricious surface may be provided by a lubricious polymer layer or a lubricious coating). In the illustrated embodiment, the guidewire lumen 24 extends all the way through the length of the inner liner 14 such that the guidewire 26 is extendable along an entire working length of the catheter 10. In one embodiment, the overall working length of the catheter 10 may be between about 135 cm (53 inches) and about 142 cm (56 inches). In use, the guidewire 26 may extend about 40 mm (1.6 inches) past a distal end of the inner liner 14.

Referring to FIG. 2, the tissue-removing element 20 extends along the longitudinal axis LA from a proximal end adjacent the distal end portion of the drive coil 12 to an opposite distal end. Any suitable tissue-removing element for removing tissue in the body lumen as it is rotated may be used in one or more embodiments. In one embodiment, the tissue-removing element 20 comprises an abrasive burr configured to abrade tissue in the body lumen. The abrasive burr 20 may have an abrasive outer surface formed, for example, by a diamond grit coating, surface etching, or the like. In one embodiment, the tissue-removing element comprises a stainless steel spheroid body with an exterior surface including 5 µm of exposed diamond crystals. The tissue-removing element 20 may also be radiopaque to allow the tissue-removing element to be visible under fluoroscopy. In other embodiments, the tissue-removing element can comprise one or more cutting elements having smooth or serrated cutting edges, a macerator, a thrombectomy wire, etc. A suitable tissue-removing element is described in U.S. application Ser. No. 16/874,372, filed May 14, 2020, the entirety of the disclosure relating to the tissue-removing element is incorporated by reference herein.

Referring to FIGS. 1 and 2, the drive coil 12 may comprise a tubular stainless steel coil configured to transfer rotation to the tissue-removing element 20. Configuring the drive coil 12 as a coiled structure provides the drive coil with a flexibility that facilitates delivery of the catheter 10 through the body lumen. In addition, the coil configuration allows for the rotation and torque of the drive coil 12 to be applied to the tissue-removing element 20 when the catheter 10 is traversed across a curved path. The stiffness of the drive coil 12 also impacts the ease at which the coil is traversed through the body lumen as well as the coil's ability to effectively transfer torque to the tissue-removing element 20. In one embodiment, the drive coil 12 is relatively stiff such that axial compression and extension of the coil is minimized during movement of the catheter 10 through a body lumen. The coil configuration of the drive coil 12 is also configured to expand its inner diameter when the coil is rotated so that the drive coil remains spaced from the inner liner 14 during operation of the catheter 10. In one embodiment, the drive coil 12 has an inner diameter of about 0.023 inches (0.6 mm) and an outer diameter of about 0.035 inches (0.9 mm). The drive coil 12 may have a single layer construction. For example, the drive coil may comprise a 7 filar (i.e., wire) coil with a lay angle of about 30 degrees. Alternatively, the drive coil 12 could be configured from multiple layers without departing from the scope of the disclosure. For example, the drive coil 12 may comprise a base coil layer and a jacket (e.g., Tecothane™) disposed over the base layer. In one embodiment, the drive coil comprises a 15 filar coil with a lay angle of about 45 degrees. The Tecothane™ jacket may be disposed over the coil. Alternatively, the drive coil 12 may comprise a dual coil layer configuration which also includes an additional jacket layer over the two coil layers. For example, the drive coil may comprise an inner coil layer comprising a 15 filar coil with a lay angle of about 45 degrees, and an outer coil layer comprising a 19 filar coil with a lay angle of about 10 degrees. Drive coils having other configurations are also envisioned. A suitable drive coil is described in U.S. patent Ser. No. 16/874,372, filed May 14, 2020, the entirety of the disclosure relating to the drive coil is incorporated by reference herein.

Referring to FIGS. 1 and 2, the inner liner 14 may comprise a multiple layer tubular body configured to isolate the guidewire 26 from the drive coil 12 and tissue-removing element 20. The inner liner 14 has an inner diameter that is sized to pass the guidewire 26. The inner liner 14 protects the guidewire from being damaged by the rotation of the drive coil 12 by isolating the guidewire from the rotatable drive coil. The inner liner 14 may also extend past the tissue-removing element 20 to protect the guidewire 26 from the rotating tissue-removing element. Thus, the inner liner 14 is configured to prevent any contact between the guidewire 26 and the rotating components of the catheter 10. Therefore, any metal-to-metal engagement is eliminated by the inner liner 14. This isolation of the drive coil 12 and tissue-removing element 20 from the guidewire 26 also ensures that the rotation of the drive coil and tissue-removing element is not transferred or transmitted to the guidewire. As a result, a standard guidewire 26 can be used with the catheter 10 because the guidewire does not have to be configured to withstand the torsional effects of the rotating components. Additionally, by extending through the tissue-removing element 20 and past the distal end of the tissue-removing element, the inner liner 14 stabilizes the tissue-removing element by providing a centering axis for rotation of the tissue-removing element about the inner liner. In one embodiment, the inner liner 14 has an inner diameter ID of about 0.016 inches (0.4 mm), an outer diameter OD of about 0.019 inches (0.5 mm), and a length of about 59 inches (1500 mm). The inner diameter ID of the inner liner 14 provides clearance for the standard 0.014-inch guidewire 26. The outer diameter OD of the inner liner 14 provides clearance for the drive coil 12 and tissue-removing element 20. Having a space between the inner liner 14 and the drive coil 12 reduces friction between the two components as well as allows for saline perfusion between the components. A suitable inner liner is described in U.S. application Ser. No. 16/874,372, filed May 14, 2020, the entirety of the disclosure relating to the inner liner is incorporated by reference herein.

Figure 3:
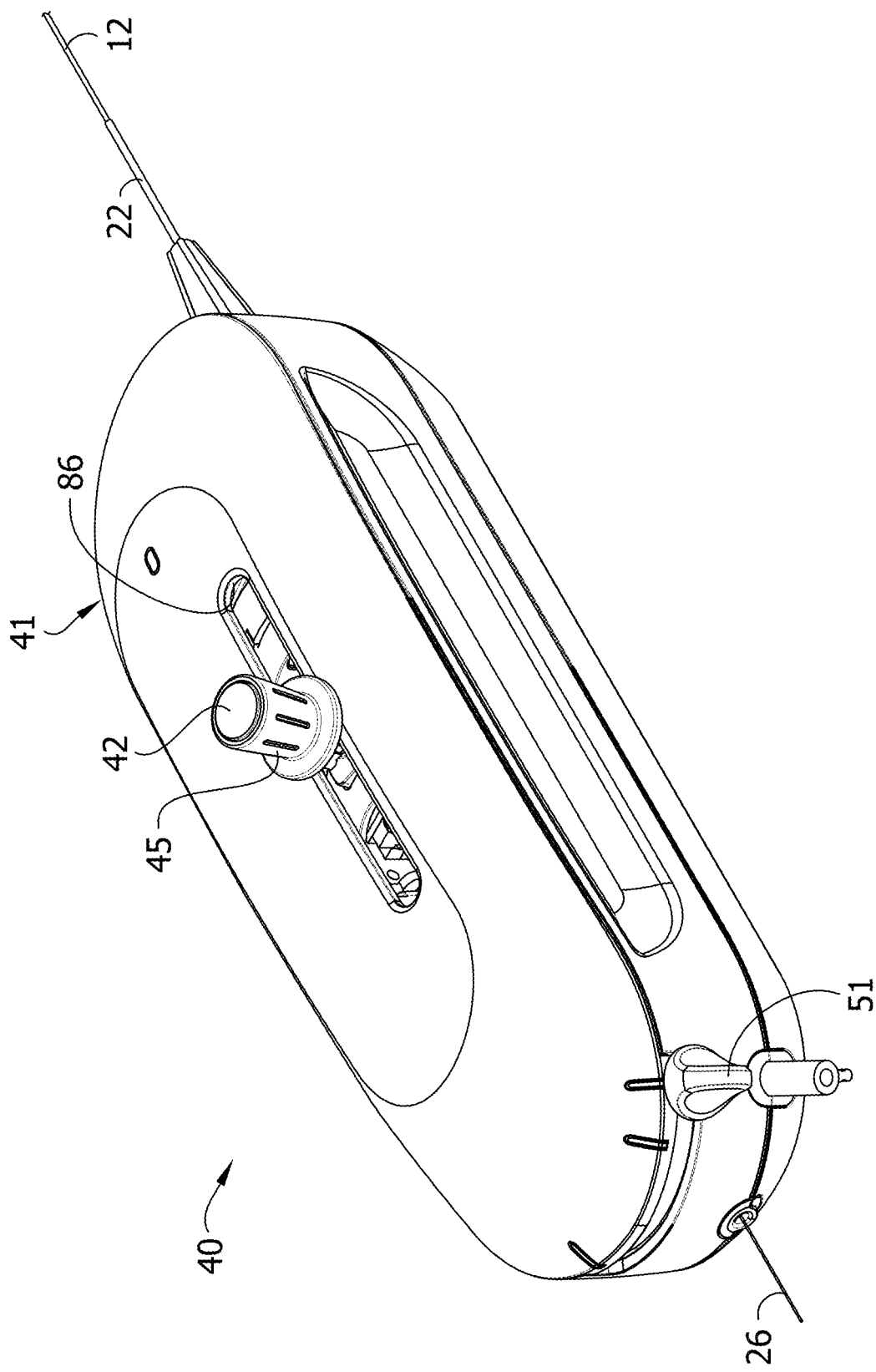
FIG. 3 is a perspective of a handle of the catheter.
Figure 4:
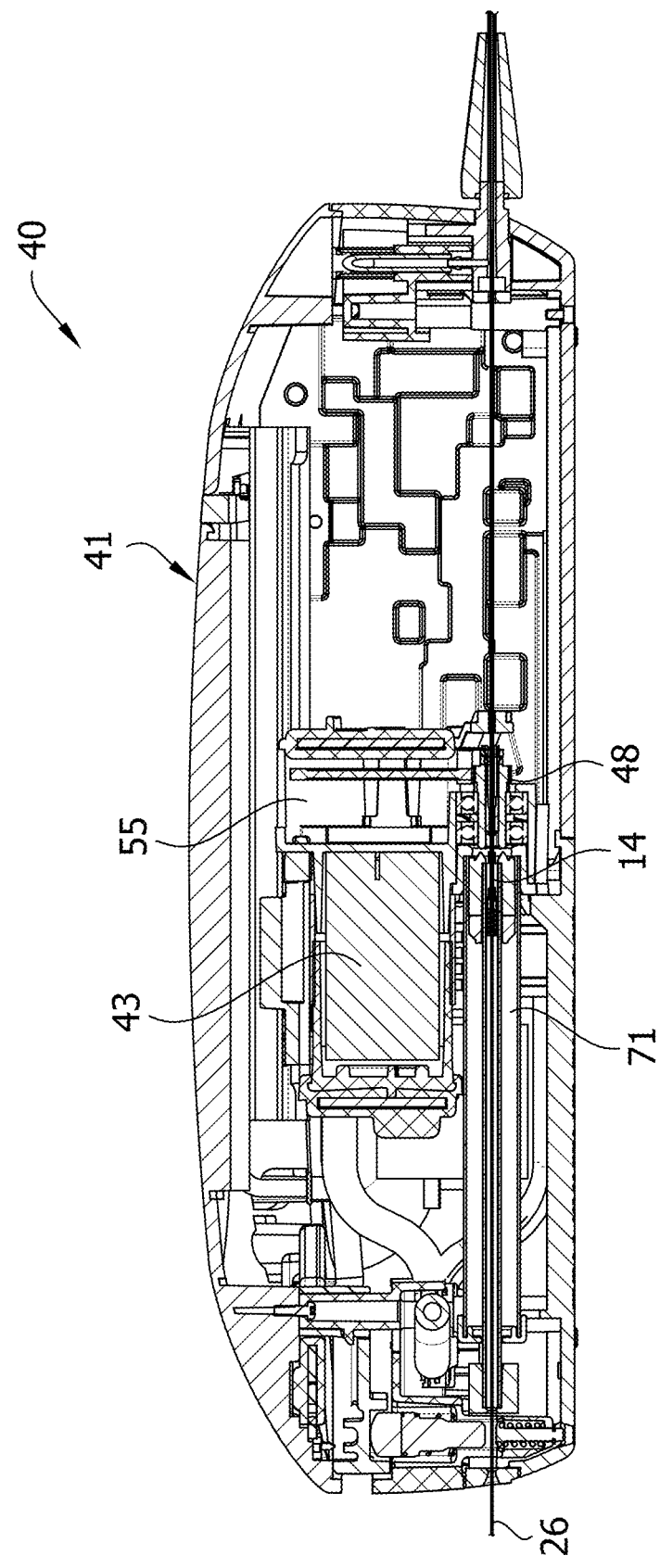
FIG. 4 is a cross section of the handle.

Referring to FIGS. 1, 3 and 4, the catheter 10 further comprises a handle 40 secured at a proximal end of the isolation sheath 22. The handle 40 comprises a housing 41 that supports the components of the handle. The housing 41 has a generally elongate egg shape and includes as plurality of housing sections secured together to enclose the internal components of the handle 40.

Referring to FIGS. 1, and 3-5, the housing 41 supports an actuator 42 (e.g., a lever, a button, a dial, a switch, or other device) configured for selectively actuating a motor 43 disposed in the handle to drive rotation of the drive coil 12, and a tissue-removing element 20 mounted at the distal end of the drive coil. The motor 43 is configured to rotate the drive coil 12 and tissue-removing element 20 at speeds of greater than about 80,000 RPM. The motor 43 is coupled to the drive coil 12 by a gear assembly 44 and drive assembly 48 supported within the housing 41. The gear assembly 44 comprises a gearbox housing 55 that mounts and at least partially encloses a pair of gears (e.g., driver gear 81 and drive gear 83) for transferring the rotation of a shaft of the motor 43 to the drive coil 12. The gearbox housing 55 includes a motor sleeve 120 on a proximal side of the housing that receives a distal end portion of the motor 43, and a tube sleeve portion 69 on the proximal side of the housing that receives a distal end portion of a buckle tube 71. The gearbox housing 55 attaches to a carriage or advancer frame 73 (FIG. 5) for moving the motor 43 and gear assembly 44 within the housing 41, as explained below. The driver gear 81 is attached to the motor shaft (not shown) such that the driver gear rotates with the motor shaft when the motor 43 is activated. The driven gear 83 meshes with the driver gear 81 so that rotation of the driver gear causes the driven gear to rotate in the opposite direction. As described below, the drive assembly 48 attaches the driven gear 83 to the drive coil 12 so that the rotation of the driven gear causes the drive coil to rotate. A controller 50 (FIG. 5) may be provided in the handle 40. The controller 50 may be programmed to control operation of the catheter. A suitable construction of gearbox housing 55, the carriage 73, the controller 50, the buckle tube 71, and other related components and structures are described in U.S. application Ser. No. 16/874,372, filed May 14, 2020, the entirety of the disclosures relating to these components and structures are incorporated by reference herein.

It is understood that other suitable actuators, including but not limited to touchscreen actuators, wireless control actuators, automated actuators directed by a controller, etc., may be suitable to selectively actuate the motor in other embodiments. In some embodiments, a power supply may come from a battery (not shown) contained within the handle 40. The battery can provide the current source for the guidewire detection circuit. In other embodiments, the power supply may come from an external source.

Figure 5:
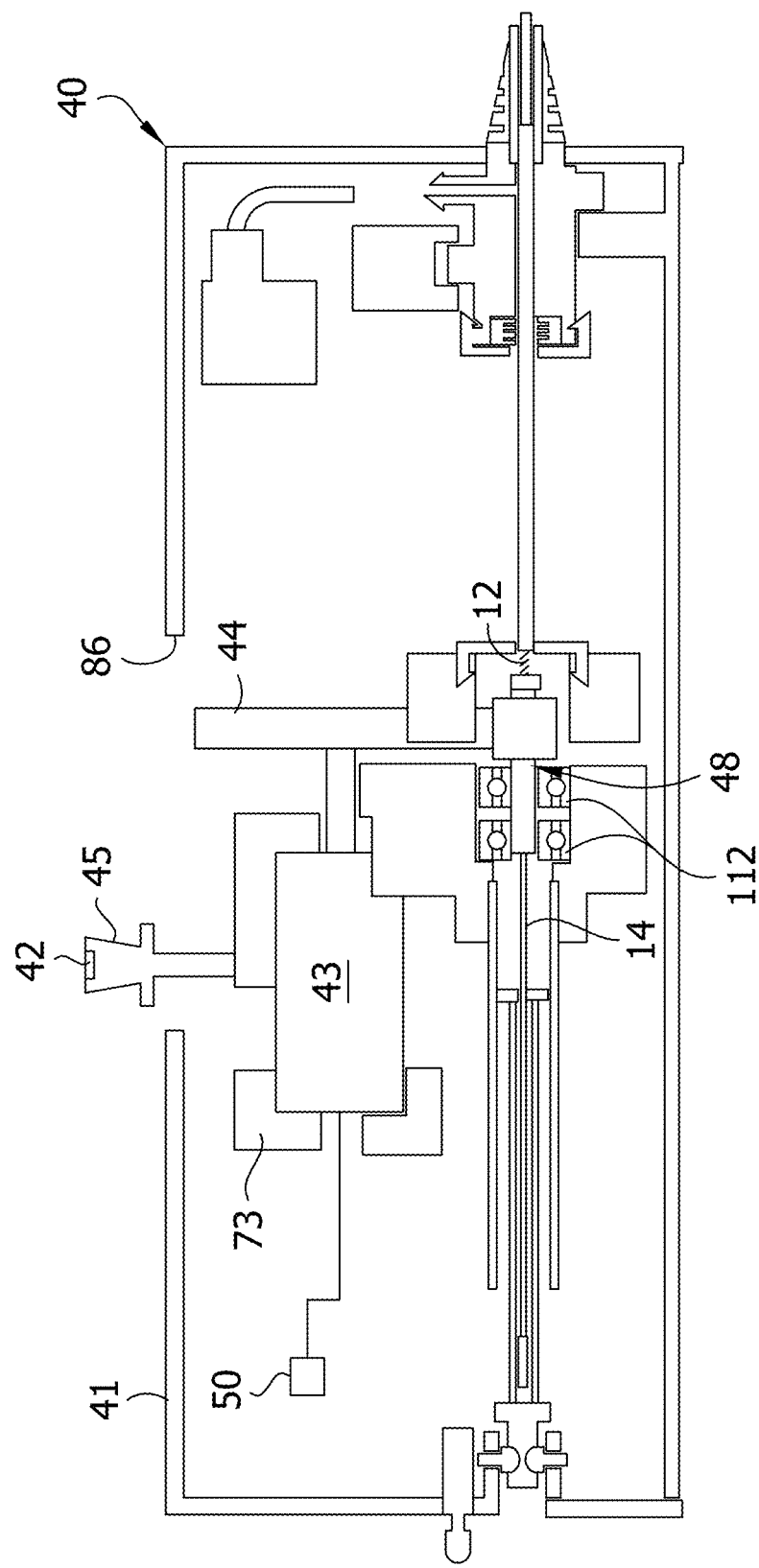
FIG. 5 is a schematic illustration of the handle.
Figure 6:
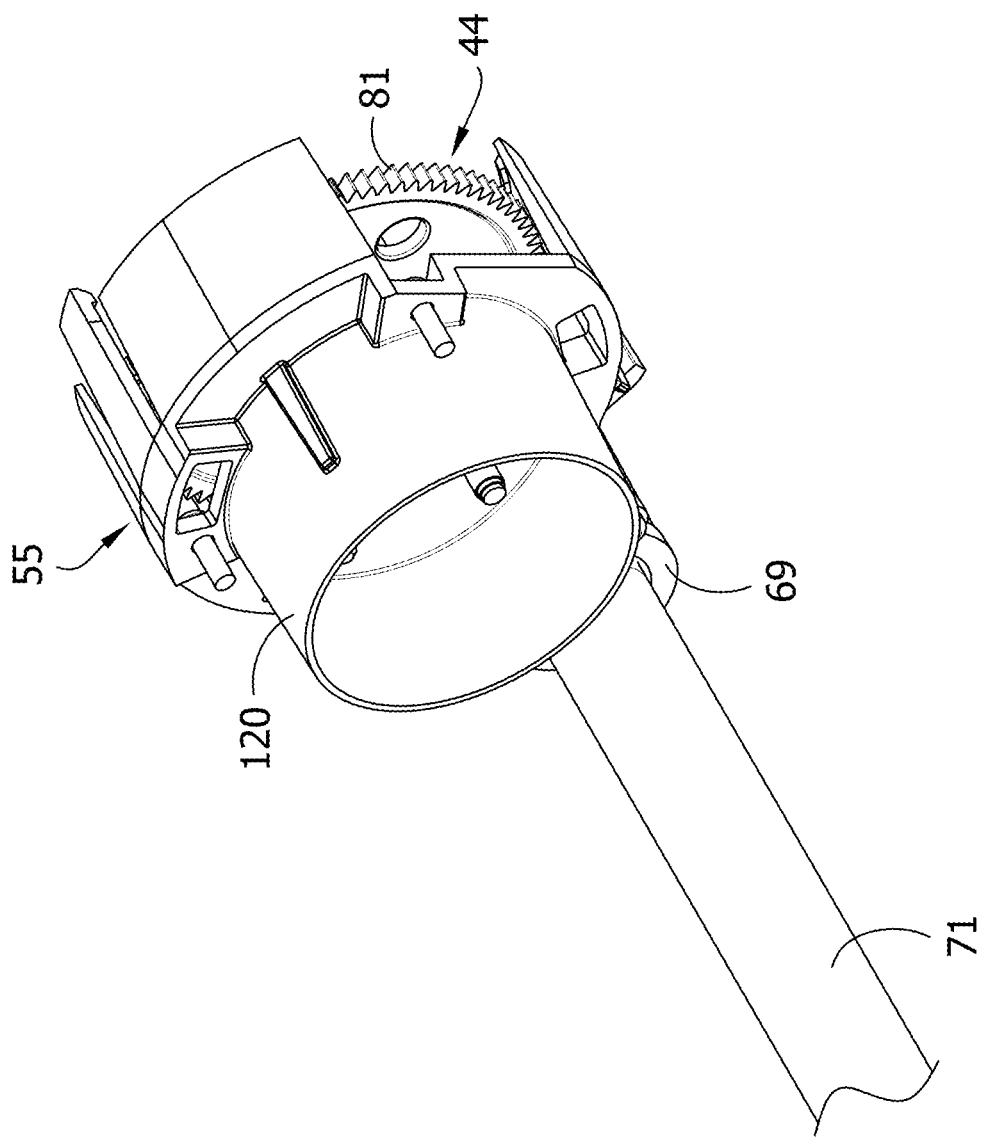
FIG. 6 is a rear perspective of components of the handle.
Figure 7:
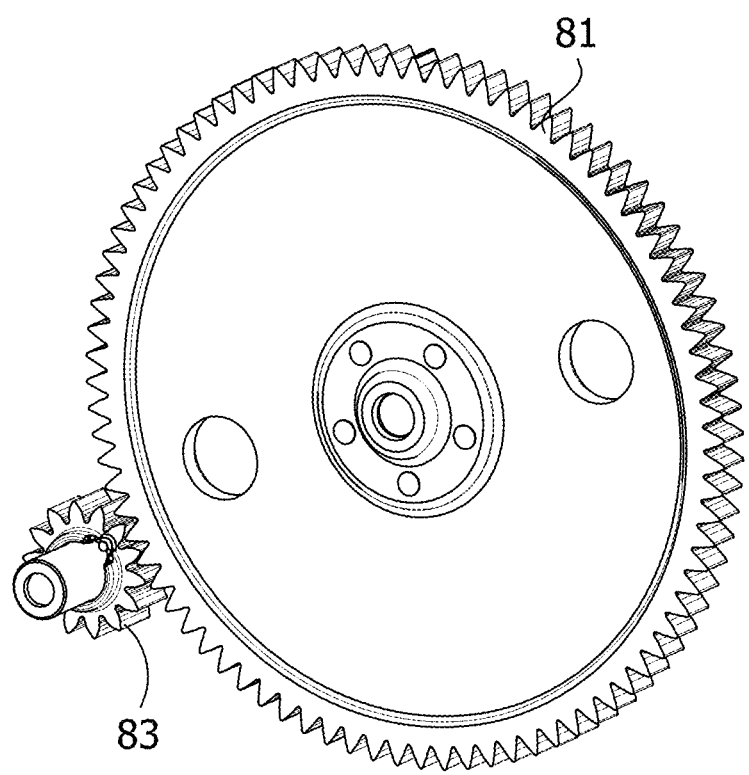
FIG. 7 is a perspective of a driving gear and drive gear of the catheter.

Referring to FIGS. 3 and 5, a slide or advancer 45 is positioned on the handle 40 and is operatively coupled to the drive coil 12 for movement of the drive coil relative to the handle to advance and retract the drive coil and tissue-removing element 20. In the embodiment shown in FIGS. 3 and 5, the actuator 43 is coupled to the advancer 45, although the actuator may be separate from the advancer such as shown schematically in FIG. 1. As shown in FIGS. 3 and 5, the housing 41 of the handle 40 may define a slot 86 which limits the movement of the slide 45 relative to the handle. Thus, the length of the slot determines the amount of relative movement between the drive coil 12 and the handle 40. In one embodiment, the slot has a length of about 70 mm (2.8 inches). The slide 45 is operatively attached to the motor and drive assembly. In particular, the illustrated slide 45 is operatively attached to the advancer frame 73 so that movement of the slide causes movement of the advancer frame, thus in turn, axial movement of at least the motor 43, the gear assembly 44, the drive assembly 48, the drive coil 12, and the tissue-removing element 20. In the illustrated embodiment, the advancer 45 also advances the liner 14 simultaneously with the other components. A suitable construction of the slide or advancer is described in U.S. application Ser. No. 16/874,372, filed May 14, 2020, the entirety of the disclosure relating to the slide or advancer is incorporated by reference herein.

Referring to FIGS. 8 and 14-17, the drive assembly 48 comprises a gear extension 100 (e.g., a gear insert) coupled to the driven gear 83 (the driven gear may be considered part of the drive assembly), and a lock 102 (e.g., an insert) received in the gear extension. In one embodiment, the gear extension 100 is press fit into the driven gear 83. Alternatively, the gear extension 100 may be formed integrally with the driven gear 83. The gear extension 100 has a proximal portion 108 extending proximally (and axially) outward from the driven gear 83, and a distal portion 110 extending distally (and axially) from the driven gear. A proximal portion 108 comprises a cylindrical member having a uniform outer diameter extending along its length, although it may have other shapes. The proximal portion 108 may be supported by (e.g., received in) one or more bearings 112 (e.g., roller bearings; FIG. 5) to facilitate rotation of the driving assembly 48 about the axis LA. The proximal portion 108 defines an axial passage 114 having a polygonal (e.g., generally rectangular) cross section and extending axially through the proximal and distal ends of the proximal portion. As seen best in FIG. 16, a pair of arcuate ribs 116 project proximally outward from the proximal end of the gear extension 100. The arcuate ribs 116 facilitate molding gates during manufacturing.

The distal portion 110 of the gear extension 100 comprises a pair of snap-fit cantilever arms 118 spaced apart and generally opposing one another. Axially-extending alignment slots or grooves 120 are defined between the cantilever arms 118 and generally oppose one another. In the illustrated embodiment, the cantilever arms 118 are resiliently deflectable away from one another and relative to the drive gear and the distal portion 110. Each cantilever arm 118 defines a snap opening 122 (e.g., slot, groove, recess, depression, through opening, blind opening, etc.) configured to receive a detent of the lock 102, as described below. Ramp surfaces 124 on interior sides of the arms 118 lead to the respective openings 122 and are configured to facilitate entry of the lock between the arms and guide the detents into the respective snap opening 122. The gear extension 100 may be formed from any suitable material including without limitation, stainless steel and Peek.

Referring to FIGS. 8-13, the lock 102 comprises an elongate lock body 130 having proximal and distal end ends, detents 136 (e.g., catches, beads, hooks, bumps, or other projections; see FIGS. 8, 10, 11, and 13) at the distal end of the lock body, and tongues 140 (see FIGS. 9, 10 and 13) at the distal end of the lock body. The lock 102 (e.g., the lock body 130) defines a lock passage 144 extending axially through the proximal and distal ends thereof. As explained below, at least a portion of the coil passage 144 is sized and shaped to receive (e.g., slidably receive) the drive coil 12 therein. The lock body 130 has a polygonal (e.g., generally rectangular) cross section and is sized and shaped to be inserted (e.g., slid) into the gear extension 100 (and the axial passage 114) through the distal portion 110. The relative dimensions and shapes of the corresponding cross sections of the lock body 130 and the axial passage 114 are such that the two are inhibited from substantially rotating relative to one another as the driven gear 83 rotates the gear extension 100. More specifically, the interior of the proximal portion 108 defining the passage 114 will engage the lock body 130 during rotation of the gear extension by the drive gear 83, thereby transferring torque from the gear extension to the lock body 130. The transfer of torque may be distributed along at least majority of the axial length of the lock body, such as at least about 60% or at least about 70%, or at least about 80%, or at least about 90%, or about an entirety of the axial length. Accordingly, rotation of the driven gear 83 and the gear extension 100 about the common axis imparts rotation of the lock body 130.

In the illustrated embodiment, the detents 136 are on opposite sides of the lock body 130, and the tongues 140 are also on opposite sides of the lock body, such that the tongues are generally disposed between the detents around the exterior of the lock body. The illustrated detents 136 are configured to engage the cantilever arms 118 as the lock 102 is inserted into the distal portion 110. The illustrated detents 136 are generally rigid and generally do not deflect when engaging the arm 118. Instead, the detents 136 impart resilient deflection of the arms 118 away from one another as the lock 102 is inserted into the distal portion 110. The detents 136 have proximal surfaces which are chamfered or beveled to facilitate the insertion of the detents 136 and the distal end portion of the lock 102 between the arms 118. Continued insertion of the lock 102 moves the detents 136 into respective snap openings 122, whereupon the arm 118 snap back into their initial, non-deflected positions. In this configuration, the detents 136 are captured in the respective snap openings 122, and the lock is coupled to the gear extension 100. During insertion, the tongues 140 facilitate alignment by entering and sliding axially into respective grooves 120 of the distal portion 110. When the lock 102 and the gear extension 100 are coupled to one another, the tongues 140 function as stops to inhibit further proximal sliding of the lock relative to the gear extension, while the distal edges of the detents 136 engage respective distal interior sides defining the snap openings 122 to inhibit distal sliding of the lock relative to the gear extension.

Figure 8:
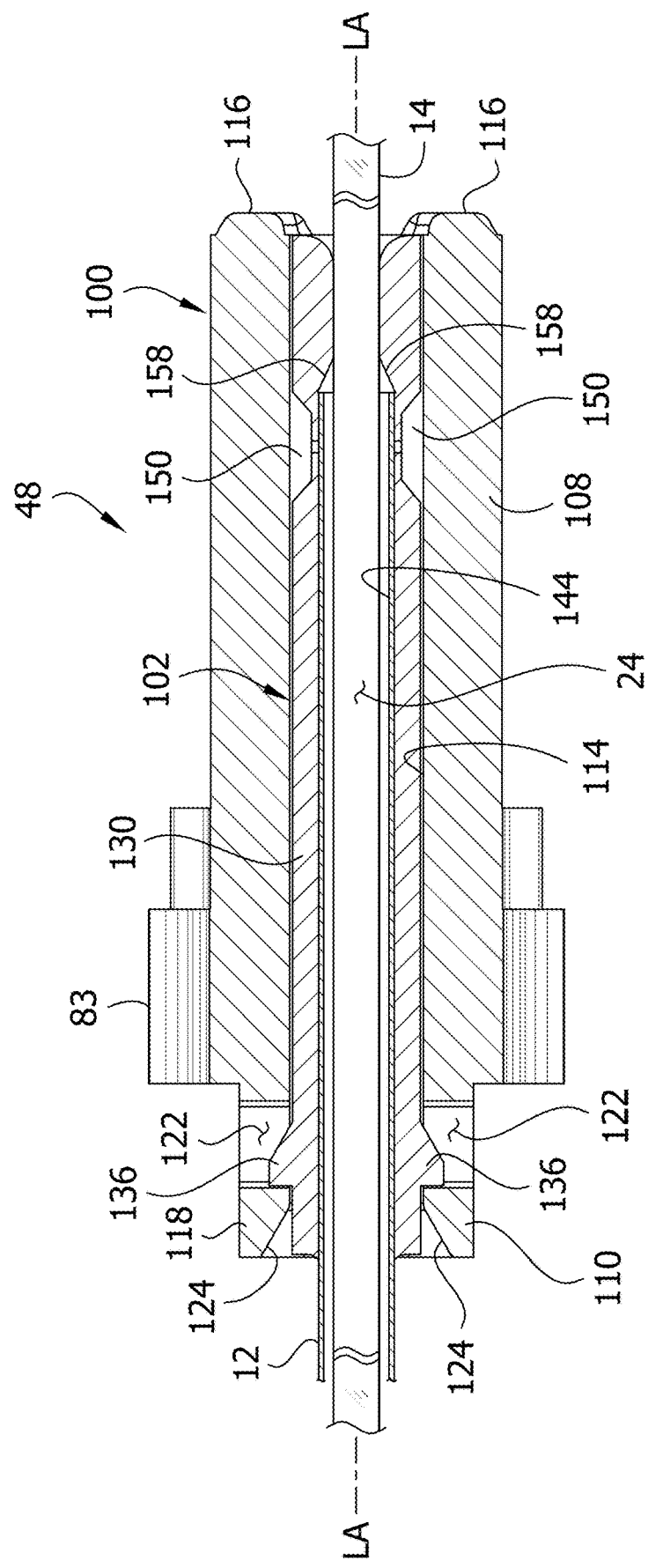
FIG. 8 is a cross section of a drive assembly including a drive coil coupled thereto and a liner extending therethrough.
Figure 9:
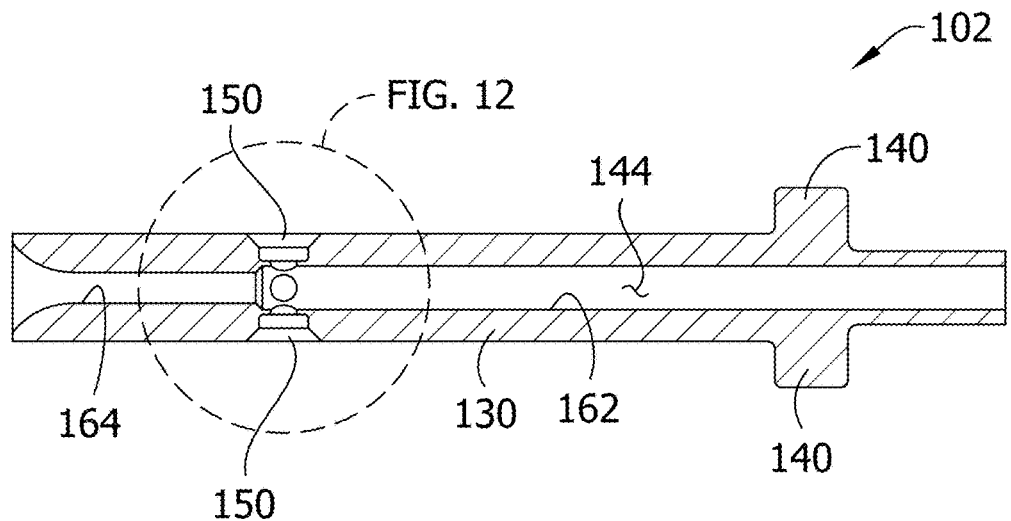
FIG. 9 is a cross section of a lock of the drive assembly.
Figure 10:
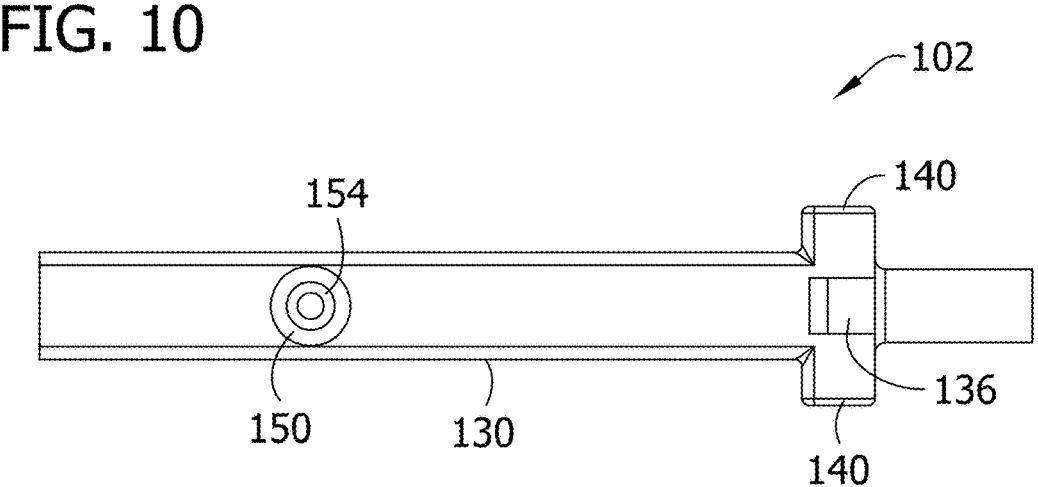
FIG. 10 is a side view of the lock.
Figure 11:
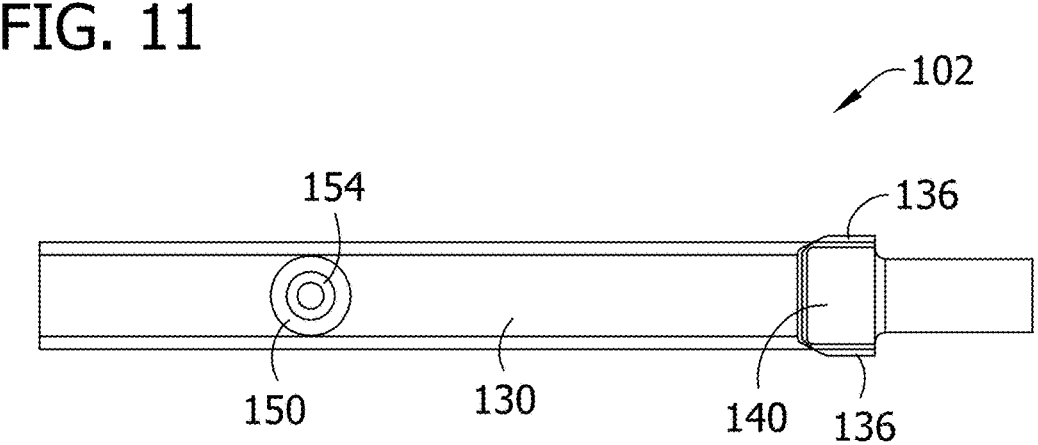
FIG. 11 is another side view rotated 90 degrees relative to the orientation in FIG. 10.

The lock 102 is fixedly coupled to the drive coil 12, such as by adhesive, welding, mechanical fixing, or in other ways. In the illustrated embodiment, the lock 102 is configured to be welded on the drive coil 12. In such an embodiment, the lock 102 may be formed from metal, such as stainless steel, or other material suitable for welding to the drive coil 12. As shown in FIG. 8, a proximal portion of the drive coil 12 received in the lock passage 144 is welded to the lock 102 at a location that is between the proximal and distal ends of the lock and spaced apart from each of the proximal and distal ends thereof. Preferably, the drive coil 12 is welded more adjacent to the proximal end of the lock body 130 while still being spaced distally from the proximal end, such as from about 0.2 in to about 0.8 in, or from about 0.5 in to about 2 in (or other distances), so that the weld is not exposed at the proximal end of the lock body. In one example, the lock body 130 defines at least one transverse welding aperture 150 (e.g., one, two, three, four, or more) extending generally transversely through (e.g., radially) through the lock body relative to the coil passage 144.

Figure 12:
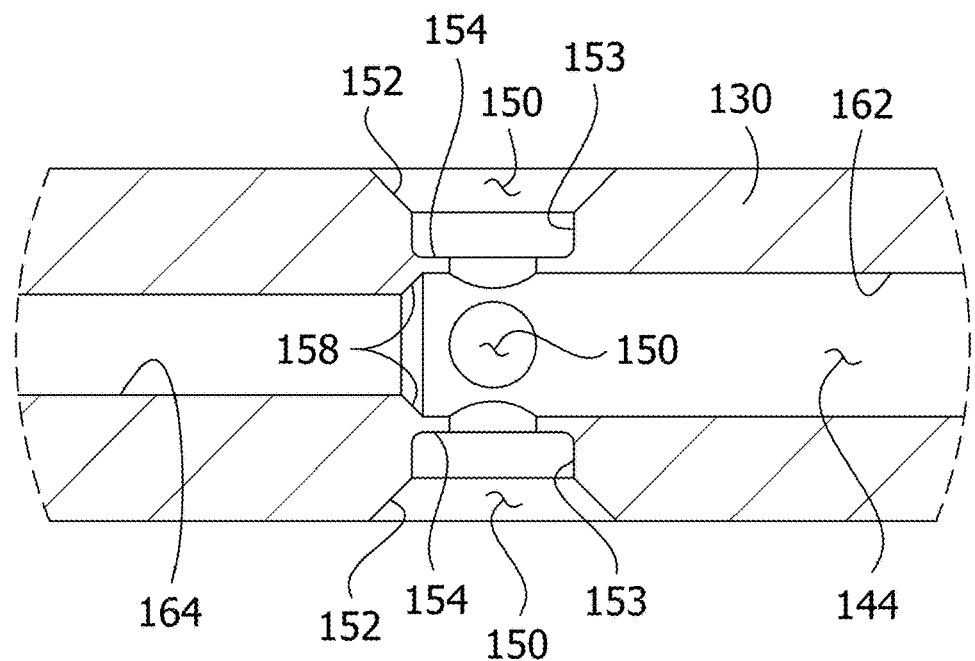
FIG. 12 is an enlarged, detailed view of the lock, as indicated in FIG. 11.
Figure 13:
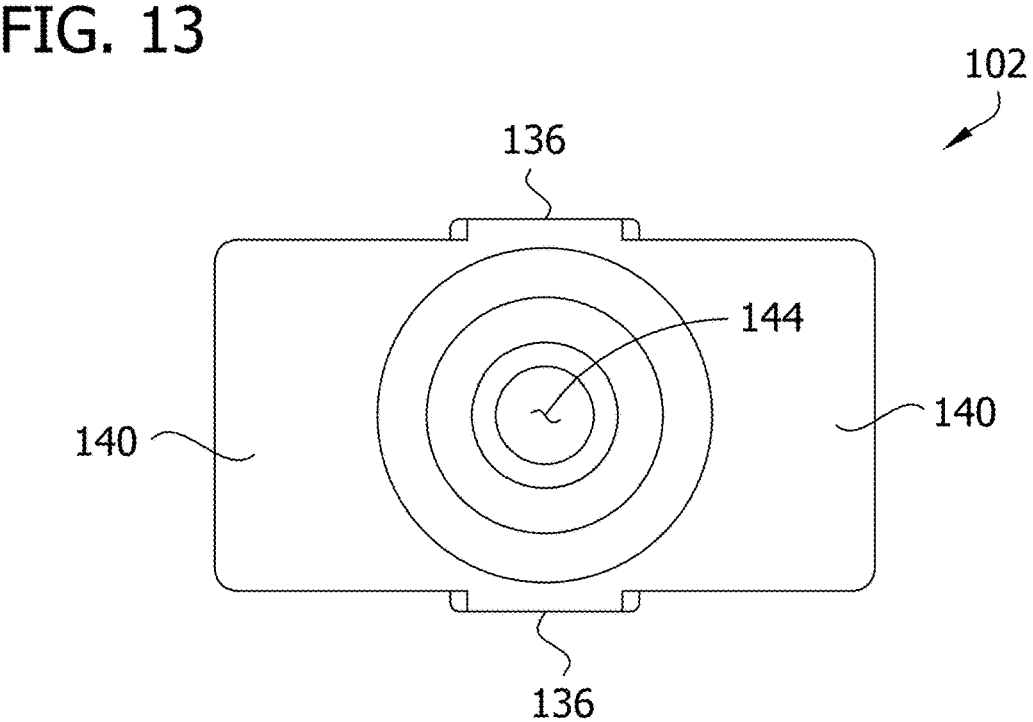
FIG. 13 is a front elevation of the lock.
Figure 18:
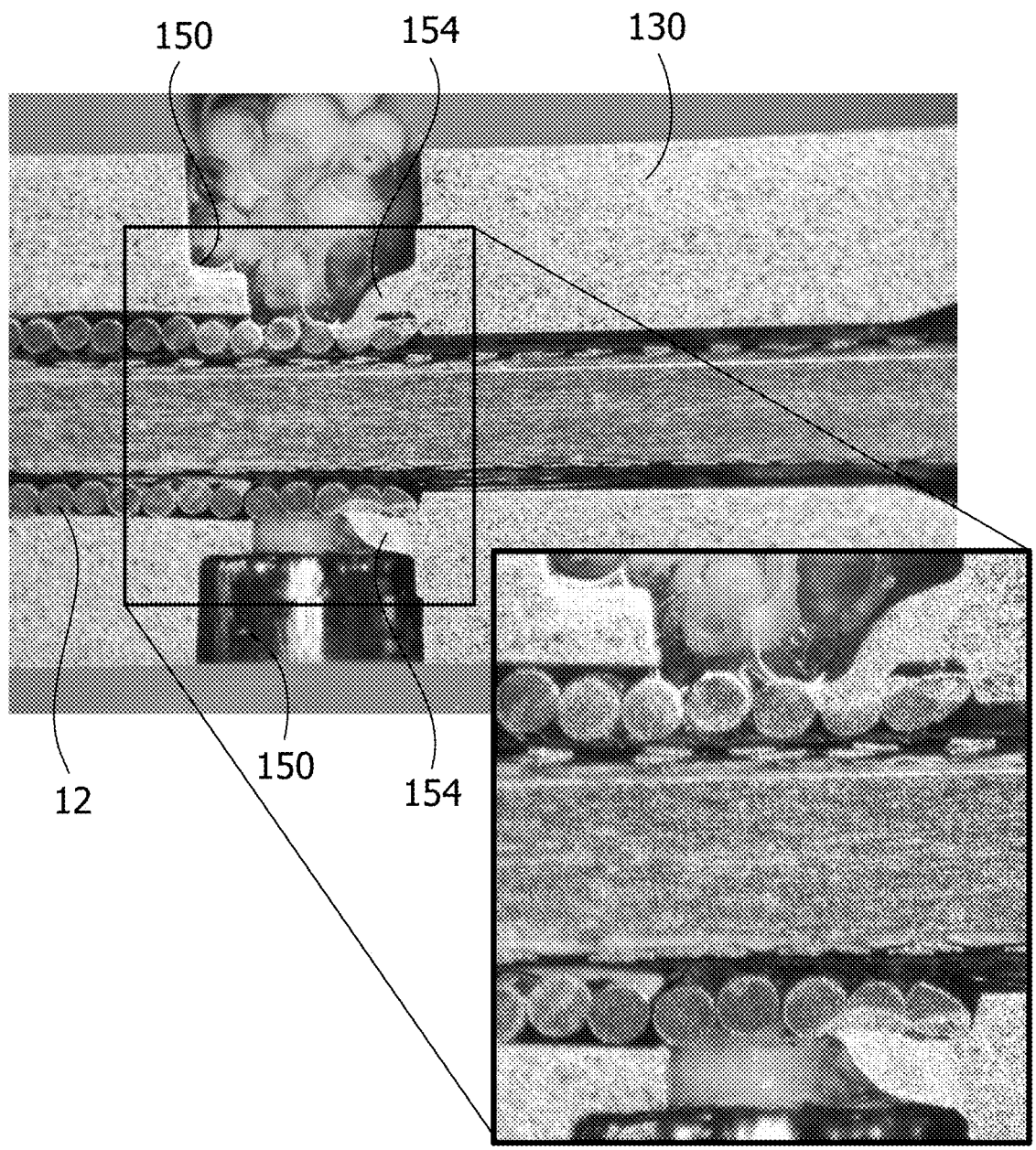
FIG. 18 is a photo showing the cross section of the drive coil welded to the lock.

In the illustrated embodiment, the lock body 130 defines four welding apertures 150 (e.g., generally round apertures), spaced around the body, with each aperture extending through a respective one of the four sides of the body. It is understood that the one or more apertures may be other shapes, such as slot shaped extending circumferentially, rectangular, oval or other shapes and sizes. The illustrated welding apertures 150 are configured to receive a welding tip (e.g., a tip of a laser welder or arc welder; not shown), which directs welding energy (i.e., heat) toward a portion of the lock body 130 and an adjacent portion of the coil drive 12 to weld the two portions to one another. It is understood that the welding tip of the welder may not be received in the welding aperture, but in either embodiment, the welding energy is directed into the welding aperture to weld the lock body 120 to the drive coil 12. Referring to FIG. 12, as illustrated, each welding aperture 150 includes a radially outer bore 152 and a radially inner counterbore 153. An interior shoulder or flange 154 (e.g., an annular shoulder or flange) of the lock body 130 is disposed at a radially inner end of the welding aperture 150. The welding tip of the welder may direct welding energy toward the at least a portion of the interior shoulder 154 (e.g., a proximal portion) to heat the shoulder and the adjacent portion of the drive coil 12, thereby welding the two to one another at the weld location. A cross section of a weld location is shown in FIG. 18.

Figure 14:
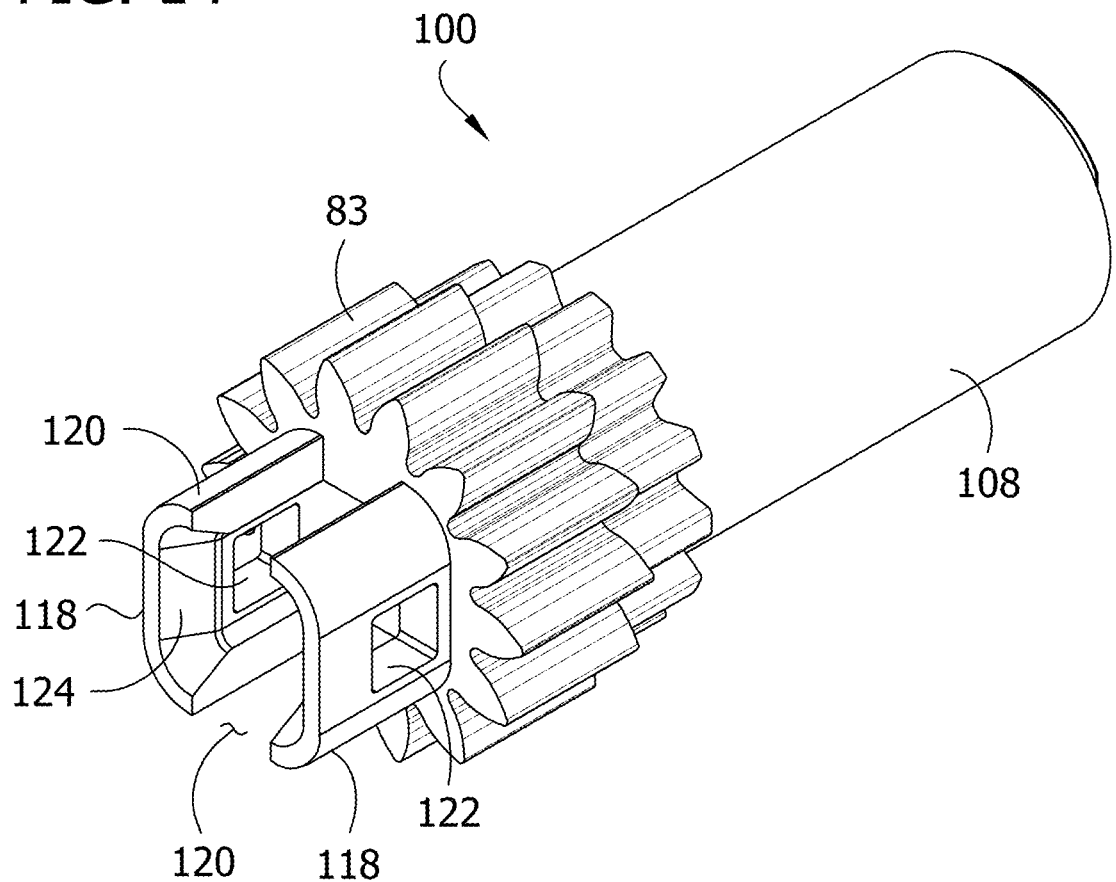
FIG. 14 is a perspective of a gear extension of the drive assembly.
Figure 15:
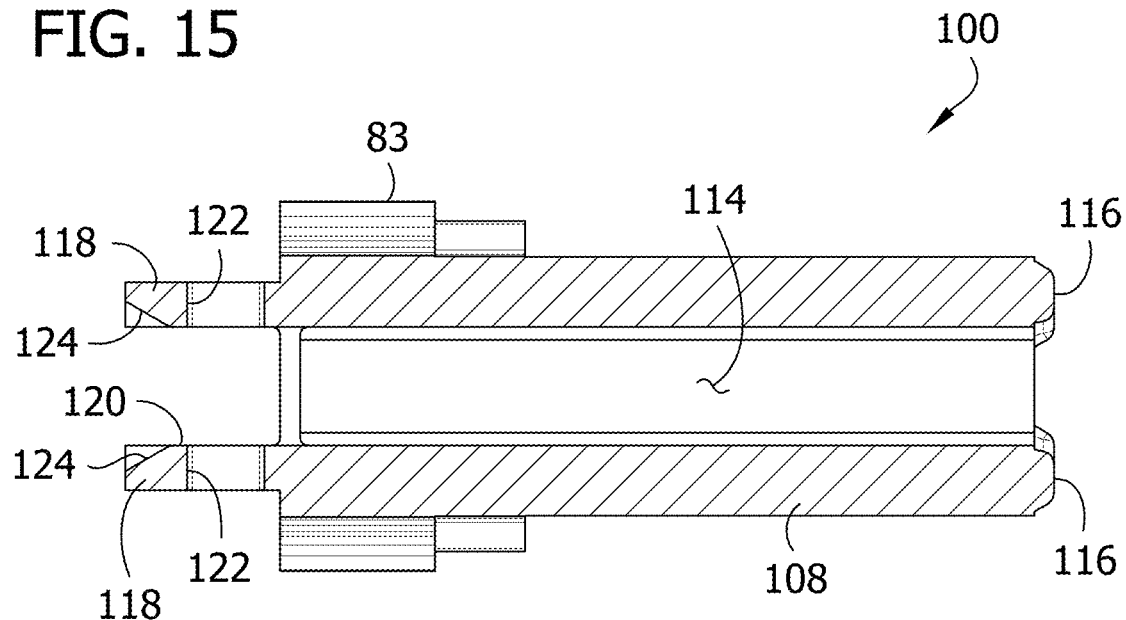
FIG. 15 is a cross section of the gear extension.
Figure 16:
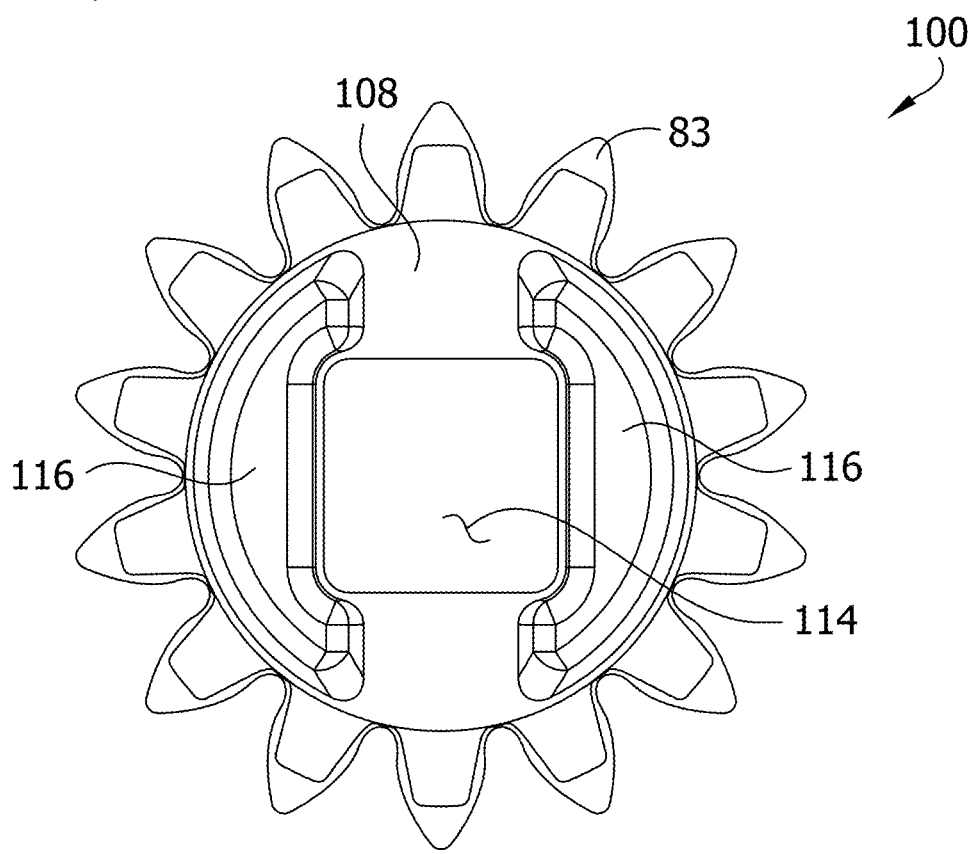
FIG. 16 is a rear elevation of the gear extension.
Figure 17:
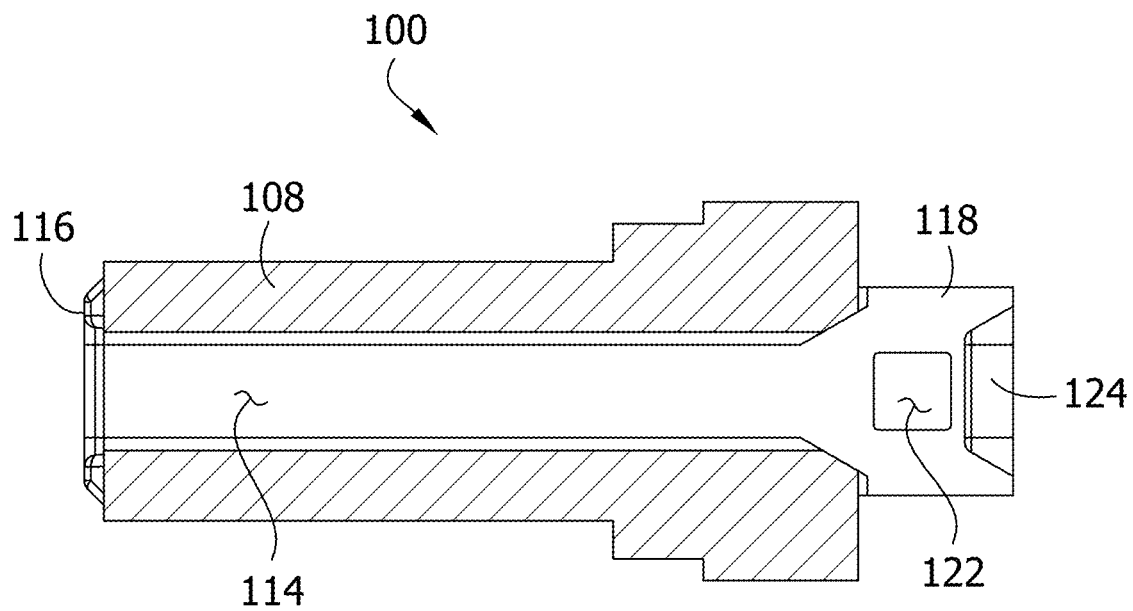
FIG. 17 is another cross section of the gear extension rotated 90 degrees relative to the orientation in FIG. 15.

In the illustrated embodiment, shown in FIGS. 8 and 14, the proximal end of the drive coil 12 is spaced distally from the proximal end of the lock 102 and the lock passage 144. In one example, the lock body 130 defines an internal coil stop 158 (see also FIG. 12) spaced distally from the proximal end of the lock 102 to inhibit further movement of the drive coil proximally beyond the stop in the lock passage 144. In the illustrated embodiment, as shown in FIG. 12, the coil stop 158 is shoulder at the intersection of a coil-receiving portion 162 (i.e., distal portion) of the lock passage having a first cross-sectional dimension (e.g., a first diameter), and a liner-receiving portion 164 (i.e., a proximal portion) of the lock passage having a second cross-sectional dimension (e.g., a second diameter) which is less than the first cross-sectional dimension. The drive coil 12 is received in the coil-receiving portion and the proximal end of the drive coil generally abuts the stop or shoulder 158 and is inhibited from entering the liner-receiving portion. The shoulder 158 may be an annular shoulder and may be beveled or chamfered so that there are no perpendicular or acute edges of the lock body 130 leading from the liner-receiving portion to the interior of the guidewire. The smaller cross-sectional dimension of the liner-receiving portion facilitates alignment of the liner 14 in the drive coil 12 and the lock body 130. The proximal end of the lock body 130 may also be chamfered or beveled or filleted, as illustrated, to facilitate insertion of the liner 14 into the liner-receiving portion of the lock passage 144.

In an exemplary method of making the tissue-removing catheter, the drive coil 12 is inserted into and welded to the lock 102, such as describe above. The lock 102, with the drive coil 12 welded thereto, is then inserted into the distal portion 110 of the gear extension 100 and snap-fit coupled thereto when the detents 136 enter the snap opening 122 of the cantilever arms 118 to effectively couple the drive coil 12 to the drive assemble 44.

Referring to FIG. 2, to remove tissue in the body lumen V of a subject, a practitioner inserts the guidewire 26 into the body lumen of the subject, to a location distal of the tissue L that is to be removed. Subsequently, the practitioner inserts the proximal end portion of the guidewire 26 through the guidewire lumen 24 of the inner liner 14 and through the handle 40 so that the guidewire extends through the proximal end of the handle. With the catheter 10 loaded onto the guidewire 26, the practitioner advances the catheter 10 along the guidewire until the tissue-removing element 20 is positioned proximal and adjacent the tissue L. While the tissue-removing element 20 is rotating, the practitioner may selectively move the drive coil 12 distally along the guidewire 26 to abrade the tissue and, for example, increase the size of the passage through the body lumen V. The practitioner may also move the drive coil 12 proximally along the guidewire 26, and may repetitively move the component in distal and proximal directions to obtain a back-and-forth motion of the tissue-removing element 20 across the tissue. During the abrading process, the inner liner 14 isolates the guidewire 26 from the rotating drive coil 12 and tissue-removing element 20 to protect the guidewire from being damaged by the rotating components. As such, the inner liner 14 is configured to withstand the torsional and frictional effects of the rotating drive coil 12 and tissue-removing element 20 without transferring those effects to the guidewire 26. When the practitioner is finished using the catheter 10, the catheter can be withdrawn from the body lumen V and unloaded from the guidewire 26 by sliding the catheter proximally along the guidewire. The guidewire 26 used for the abrading process may remain in the body lumen V for use in a subsequent procedure.

When introducing elements of the present invention or the one or more embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above apparatuses, systems, and methods without departing from the scope of the invention, it is intended that all matter contained in the above description and shown in the accompanying drawings shall be interpreted as illustrative and not in a limiting sense.

What is claimed is:

1. A tissue-removing catheter for removing tissue in a body lumen, the tissue-removing catheter comprising:
   a drive assembly including a gear rotatable about an axis, a gear extension coupled to the gear and extending axially outward from the gear, and a lock received in and coupled to the gear extension, wherein the gear extension is configured to be rotatably driven by the gear, and the lock is configured to be rotatably driven by the gear extension; and
   a drive coil received in and coupled to the lock, wherein the drive coil is configured to be rotatably driven by the lock, whereby rotation of the gear imparts rotation to the drive coil,
   wherein the drive coil is welded to the lock,
   wherein the lock includes a lock body defining a lock passage in which the drive coil is received, wherein the lock body defines at least one welding aperture extending generally transverse to the lock passage, the at least one welding aperture configured to facilitate welding of the lock to the drive coil.

2. The tissue-removing catheter set forth in claim 1, wherein the lock body includes an interior shoulder at a radially inner end of the welding aperture, wherein the interior shoulder is welded to the drive coil.

3. The tissue-removing catheter set forth in claim 1, the lock body including an internal coil stop configured to engage a proximal end of the drive coil and inhibit movement of the drive coil proximally beyond the stop.

4. The tissue-removing catheter set forth in claim 3, wherein the lock passage includes a distal portion having first cross-sectional dimension, and a proximal portion having a second cross-sectional dimension which is less than the first cross-sectional dimension, wherein the stop comprises a shoulder at the intersection of the distal and proximal portions of the lock passage.

5. The tissue-removing catheter set forth in claim 4, wherein the drive coil is received in the distal portion of the lock passage and the proximal end of the drive coil generally abuts the shoulder and is inhibited from entering the proximal portion of the lock passage.

6. The tissue-removing catheter set forth in claim 1, wherein the lock is coupled to the gear extension by a snap-fit connection.

7. The tissue-removing catheter set forth in claim 6,
   wherein the lock includes a pair of detents on opposite sides of the lock body, and pair of a tongues on different opposite sides of the lock body,
   wherein the gear extension includes a pair of opposing snap-fit cantilever arms which are resiliently deflectable away from one another, and a pair of axially-extending alignment grooves defined between the snap-fit arms, each cantilever arm defining a snap opening,
   wherein the detents are configured to enter the snap openings and the tongues are configured to enter the alignment grooves to couple the lock to the gear extension.

8. The tissue-removing catheter set forth in claim 1, wherein the gear extension defines an axial passage in which the lock is received, wherein the axial passage and the lock having corresponding polygonal cross-sectional shapes.

9. The tissue-removing catheter set forth in claim 1, further comprising a liner received in the drive coil including a portion of the drive coil that is received in the drive assembly, wherein the liner is configured to receive a guidewire therein.

10. A tissue-removing catheter for removing tissue in a body lumen, the tissue-removing catheter comprising:
    a drive assembly including a gear rotatable about an axis, a gear extension coupled to the gear and extending axially outward from the gear, and a lock received in and coupled to the gear extension, wherein the gear extension is configured to be rotatably driven by the gear, and the lock is configured to be rotatably driven by the gear extension; and
    an elongate drive member received in and coupled to the lock, wherein the drive member is configured to be rotatably driven by the lock, whereby rotation of the gear imparts rotation to the drive member,
    wherein the lock includes a lock body defining a lock passage in which the drive member is received, the lock body including an internal drive member stop configured to engage a proximal end of the drive member and inhibit movement of the drive member proximally beyond the stop.

11. The tissue-removing catheter set forth in claim 10, wherein the elongate drive member comprises a drive coil.

12. The tissue-removing catheter set forth in claim 10, wherein the drive member is welded to the lock.

13. The tissue-removing catheter set forth in claim 10, wherein the lock passage includes a distal portion having first cross-sectional dimension, and a proximal portion having a second cross-sectional dimension which is less than the first cross-sectional dimension, wherein the stop comprises a shoulder at the intersection of the distal and proximal portions of the lock passage.

14. The tissue-removing catheter set forth in claim 13, wherein the drive member is received in the distal portion of the lock passage and the proximal end of the drive member generally abuts the shoulder and is inhibited from entering the proximal portion of the lock passage.

15. The tissue-removing catheter set forth in claim 10, wherein the lock is coupled to the gear extension by a snap-fit connection.

16. The tissue-removing catheter set forth in claim 10, wherein the gear extension defines an axial passage in which the lock is received, wherein the axial passage and the lock having corresponding polygonal cross-sectional shapes.

17. The tissue-removing catheter set forth in claim 10, wherein the drive member is welded to the lock at a welding location that is between and spaced apart from proximal and distal ends of the lock.

\* \* \* \* \*